United States Patent
Darcas et al.

[15] 3,699,148
[45] Oct. 17, 1972

[54] PROCESS FOR THE SYNTHESIS OF 2-HYDROXY 4-METHYLTHIO BUTYRONITRILE

[72] Inventors: Claude Darcas; Raymond Jobert; Charles Laviron, all of Saint-Avold, France

[73] Assignee: UGILOR, Paris, France

[22] Filed: Sept. 23, 1969

[21] Appl. No.: 860,432

[30] Foreign Application Priority Data

Sept. 24, 1968   France....................68167263

[52] U.S. Cl............................................260/465.6
[51] Int. Cl.............................................C07c 121/34
[58] Field of Search......................260/465.6, 465.5 R

[56] References Cited

UNITED STATES PATENTS 2,542,768   2/1951   Gresham et al.........260/465.6
2,745,745   5/1956   Blake et al..........260/465.6 X
3,131,210   4/1964   Hugel et al. ............260/465.5

FOREIGN PATENTS OR APPLICATIONS 605,311   7/1948   Great Britain..........260/465.6

Primary Examiner—Joseph P. Brust
Attorney—Webb, Burden, Robinson & Webb

[57] ABSTRACT

A process, either continuous or intermittent, for the synthesis of 2-hydroxy 4-methylthio butyronitrile which comprises adding an amount of methyl mercaptan to a mixture of acrolein cyanohydrin and a basic agent, said basic agent being used in an amount such that the pH of a solution obtained by diluting said mixture twenty times with distilled water is maintained between 7 and 8, said methyl mercaptan being 5 to 50 percent in excess of the stoichiometric amount relative to the cyanohydrin. The excess mercaptan is eliminated and can be recycled or reused for the continuous or intermittent process respectively.

10 Claims, No Drawings

PROCESS FOR THE SYNTHESIS OF 2-HYDROXY 4-METHYLTHIO BUTYRONITRILE

Our invention relates to the synthesis of 2-hydroxy 4-methylthio butyronitrile and, more particularly, to the improved synthesis of 2-hydroxy 4-methylthio butyronitrile from acrolein cyanohydrin and methyl mercaptan.

The reaction of acrolein cyanohydrin and methyl mercaptan to form 2-hydroxy 4-methylthio butyronitrile is well-known and can be shown as follows:

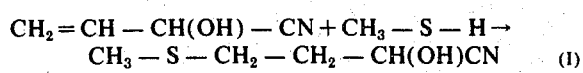

$$CH_2 = CH - CH(OH) - CN + CH_3 - S - H \rightarrow$$
$$CH_3 - S - CH_2 - CH_2 - CH(OH)CN \quad (1)$$

The known methods used for catalyzing the reaction of adding mercaptan to the double bond of acrolein cyanohydrin are not very reliable in that they are based on empirical ponderal correlations; thus, for example, the prior art teaches using quantities of 0.1 to 0.25 g of potassium cyanide per mole of cyanohydric acid engaged in the cyanohydrin, in other words, per mole of cyanohydrin (see British Pat. No. 605.311, patented Apr. 17, 1945, and French Pat. No 962.072, patented Feb. 26, 1948).

This known procedure gives rise to disappointments and produces mediocre results. The reaction does not start, or remains incomplete as soon as a catalyst different from potassium cyanide is used, or as soon as one applies impure original materials such as acrolein cyanohydrin obtained or kept in a stabilized form by the addition of the usual stabilizers.

Moreover, it is important that all the acrolein cyanohydrin be consumed; and, on the other hand, it is of prime importance not to lose the mercaptan which is an expensive reagent. In order to obtain a complete conversion of one or the other of the reagents, it is possible to try to increase the reaction speed by an excess of a catalyst; nevertheless, this manner of operation leads to poor yields since a portion of the acrolein cyanohydrin is polymerized and another portion is dissociated into cyanohydric acid and into acrolein. The liberated cyanohydric acid in turn reacts on the double bond of acrolein and cyanohydrin. The mercaptan itself produces by-products in an overly basic medium.

It is true that the use of an excess of acrolein cyanohydrin leads to a satisfactory transformation of methyl mercaptan. However, the purity of the final product is greatly diminished by the presence of unreacted acrolein cyanohydrin. Therefore, not only is the reagent lost, but separating the reagent from 2-hydroxy 4-methylthio butyronitrile requires burdensome techniques.

Our invention permits the treatment of any pure or crude acrolein cyanohydrin whatsoever without having to be concerned about its origin and the nature of the impurities present. Further, our invention results in high yields, exceeding 90 percent relative to the raw materials used.

2-hydroxy 4-methylthio butyronitrile produced in accordance with our invention is an important intermediate in the synthesis of methionine, or 2-amino 4-methylthio butyric acid and its analogous hydroxy, both being used for supplementation of animal or human diets, or even for various pharmaceutical purposes.

Our invention is an improvement on the conventional known ways of making 2-hydroxy 4-methylthio butyronitrile from acrolein cyanohydrin and methyl mercaptan. Our process comprises preparing a reactive medium containing at least cyanohydrin and a basic agent in relative quantities such that the cyanohydrin diluted from 5 to 100 volumes with distilled water has a pH between 7 and 8, and preferably 7.2 to 7.5. Into this solution is introduced methyl mercaptan and possibly an additional quantity of a basic agent so as to maintain the desired pH in the reaction zone. The introduction of the mercaptan is manipulated until an excess is obtained ranging between 5 and 50 percent relative to the cyanohydrin engaged by regulating the speed of introducing the mercaptan. The speed is also controlled in conjunction with a cooling means to maintain a temperature between 0° and 65° C. The excess mercaptan is then removed and reused or recycled.

It is well-known that the acrolein cyanohydrin necessary for the mercaptization reaction (I) can be obtained, for example, either by direct synthesis from cyanohydric acid and acrolein, or as a by-product in the synthesis of acrylonitrile by ammoxidation of propylene. The process of the invention permits the use of any of these products for synthesizing 2-hydroxy 4-methylthio butyronitrile according to reaction (I), subject to the introduction into the reactive medium of a predetermined amount of a basic agent acting as the catalyst.

We have found that the only condition to be imposed on the basic agent is that it regulate the alkalinity of the medium in such a way that an aqueous solution of this medium at 5 percent by volume will have a pH between 7 and 8, and preferably between 7.2 and 7.5. The solution which contains acrolein cyanohydrin and the basic agent may also contain free mercaptan in excess, nitrile already formed, as well as the impurities introduced with the original materials.

The basic agent or catalyst can be an alkaline or alkaline-earth hydroxide, an alkaline carbonate, a cyanide, or any other compound mineral with an alkaline reaction. It is likewise possible to use organic bases such as triethyl amine, dimethyl cyclohexyl amine, quarternary ammonium hydroxides, etc.

One of the characteristics of the invention which makes it possible to obtain high yields of more than 90 percent relative to the acrolein cyanohydrin used, as well as a high reaction speed, is the use of an excess of mercaptan amounting form 5 to 50 percent of the theoretical amount and preferably 10 to 25 percent of the latter. The presence of this excess mercaptan does not bring with it excessive consumption of the reagent, for the latter can be recovered by degasification and reused or recycled.

The reaction (I) of mercaptization is very exothermic and should be controlled by controlling the speed of introducing the mercaptan and by employing a suitable cooling device to maintain a temperature range from 0° to 65° C.

Our invention may be carried out either intermittently or continuously. When used intermittently, the speed of adding the mercaptan to the reactive solution should be regulated under the conditions of use resulting from the solubility of the mercaptan in the reactive medium and the exothermicity of the reaction.

When used continuously, the reaction solution permanently maintains excess of mercaptan once the reactive equilibrium has been established.

According to a preferred embodiment of our invention, the recovered mercaptan is re-introduced into the reactive cycle. This then makes it possible in the last reaction stage to use only the stoichiometric amounts of acrolein cyanohydrin and methyl mercaptan which in effect results in the necessary excess referred to hereinbefore. This, of course, maintains high yields with respect to the mercaptan. This preferred embodiment includes:

an absorption phase where the cyanohydrin-catalyst solution reacts on the excess mercaptan issuing from a degasification (recovery) zone;

a reaction phase where the mercaptan is introduced in a stoichiometric quantity relative to the cyanohydrin used in the absorption phase and thus is found in excess relative to the cyanohydrin arriving in the zone;

a mercaptan recovery phase where the portion of the mercaptan that was not reacted in the reaction phase is degasified and then directed by a suitable means into the absorption phase.

The process can be illustrated by the following non-limiting examples. Examples 1 and 3 are presented to show the poor or mediocre results obtained from the use of the already known processes, whereas Examples 2 and 4 shown what can be done when using our invention as an intermittent process and as a continuous process, respectively.

The various examples relate to the realization of the process of our invention at atmospheric pressure, but this process may also be realized under higher pressures ranging from 1 and 5 atm.

EXAMPLE 1

1010 g of crude acrolein cyanohydrin, a by-product from the synthesis of acrylonitrile by ammoxidation of propylene, was introduced into a 2 liter capacity reactor furnished with interior refrigerating coils, a stirring device, a small tube for introducing the methyl mercaptan, and a reflux condenser. This crude product, stabilized by sulfonic paratoluene acid contained 56.5 percent by weight of acrolein cyanohydrin and had a density of roughly 1. 1.72 g of potassium cyanide were added as a catalyst which corresponds to 0.25 g of potassium cyanide per mole of cyanohydrin. The amount of the catalyst is taught in French Pat. No. 962,072 referred to above.

Then gaseous methyl mercaptan was introduced into the liquid. No visible reaction took place. The addition of a 10 times greater amount of potassium cyanide did not even make it possible to maintain an adequate reaction speed and the reaction stopped very quickly.

This example shows that the act of indexing the amount of catalyst according to the number of molecules of cyanohydrin used as taught by the prior art is not sufficient to obtain a mercaptization reaction.

EXAMPLE 2

The raw materials and the material used were the same as those in Example 1.

An aqueous solution of cyanohydrin was prepared by diluting 5 parts by volume of crude acrolein cyanohydrin, containing 56.5 percent of acrolein cyanohydrin, with 100 parts distilled water.

In order to determine the content of potassium cyanide to be used as a catalyst in out process, the pH curve of this solution was plotted as a function of the amounts of potassium cyanide.

From the curve we found that 0.27 g of potassium cyanide imparts a pH of 7.3 to a solution containing 10 cm3 of crude acrolein cyanohydrin brought up to 200 cm3 by distilled water.

We then introduced into the reactor 1,010 g of crude cyanohydrin to which 27.3 g of potassium cyanide were added as a catalyst. Then through the small tube provided therefor, 410.8 g of gaseous methyl mercaptan was added while stirring and keeping the reactor temperature around 10° to 15° C. The amount of methyl mercaptan corresponds to an excess of 24 percent relative to the stoichiometry. The reaction was very exothermic and lasted 2 hours.

At the end of the reaction, we found in the reactor 1,448 g of a product containing 56.9 percent by weight of 244-methylthio butyronitrile and 5.65 percent of methyl mercaptan.

The yield of 2-hydroxy 4-methylthio butyronitrile relative to the acrolein cyanohydrin was 91.4 percent. The yield relative to the methyl mercaptan consumed was 91.8 percent while the yield relative to the methyl mercaptan engaged was only 73.5 percent. This shows the importance of introducing an excess of methyl mercaptan according to our invention and of recycling it.

EXAMPLE 3

1,000 g of crude acrolein cyanohydrin with 75 percent by weight of acrolein cyanohydrin was introduced into the same apparatus as that described in Example 1. 18.6 g of pyridine, an amount of the catalyst founded on the fact that 0.093 g of pyridine will produce a pH of 7.45 in a solution containing 5 cm3 of the crude product diluted to 100 cm3 by distilled water, was added to said crude product.

Then 435 g of methyl mercaptan were added, which represents stoichiometry. The reaction which lasted 3 hours and 45 minutes, was lively at the start of the addition of the mercaptan and then slowed down.

The yield with regard to consumed products was 80 percent relative to the acrolein cyanohydrin and 82 percent relative to the mercaptan. These yields are poorer than those in Example 2, because the reaction had not profited from an excess of mercaptan.

EXAMPLE 4

The reaction was carried out continuously in an apparatus including basically:

an absorption column, hereinafter referred to as column A, 200 cm high and 2.5 cm in diameter, equipped with serpentine coils;

a reactor with a capacity of 2 liters vigorously stirred and chilled;

a degasification column hereinafter referred to as column D identical to the absorption column.

The crude acrolein cyanohydrin used titrated 59 percent by weight of acrolein cyanohydrin and was stabilized by benzene sulfonic acid.

The measurements taken on a 5 percent by volume solution of crude product in distilled water indicated the amount of soda hydroxide (basic agent) at 80 g per liter which must be added to the 5 percent solution in order to obtain a pH of 7.2 – 7.3, and then the amount of soda hydroxide, to be added to the crude product itself to catalyze the reaction.

Into column A 600 g/hr of crude cyanohydrin was introduced with the catalyst which was 50 cm³ hr of soda hydroxide at 80 g per liter.

This crude cyanohydrin reacted with the methyl mercaptan contained in the gases that emerged from the degasification column D and which was introduced at the bottom of column A.

In view of the large excess of cyanohydrin relative to the mercaptan contained in these gases, all the mercaptan was reacted and at the top of the column the gas that was carried along was practically free of mercaptan.

The mixture issuing from column A, partially transformed into 2-hydroxy 4-methylthio butyronitrile, was introduced into reactor R. Also introduced into this reactor was 205 g/hr of mercaptan, which relative to the amount of acrolein cyanohydrin introduced into column A, represents stoichiometry. Taking into account the cyanohydrin already reacted in column A, the mercaptan present in the reactor was 25 percent in excess relative to the incoming cyanohydrin.

A catalyst supplement can be introduced into the reactor if the pH of the solution (reactive medium, 5 percent by volume, in distilled water) drops below 7 to 7.2. The temperature of the reactor was kept at 10° to 15° C. The reactor continuously produced 906 g/hr of product which fed the degasification column D at the top.

At the bottom of degasification column D at inert gas, in this case nitrogen, was injected at a flow of about 300 liters/hr. This flow of gas drew along with it the free methyl mercaptan contained in the product fed in at the top and transferred it to the bottom of the absorption column, where it was quantitatively absorbed.

At the bottom of this colum, D was 586 g/hr of a product titrating 60 percent of 2-hydroxy 4-methylthio butyronitrile, and containing indeterminable traces of mercaptan and acrolein cyanohydrin.

The carrier gas, freed of the mercaptan that it draws along, emerged from the top of absorption column A and was discharged into the atmosphere. Preferably it is recovered by the intake of a compressor in order to be recycled to the degasification column. If necessary, purging may be done and a corresponding fresh input of inert gas may be done and a corresponding fresh input of inert gas may be effected.

The yield was established at 92 percent relative to the reacted acrolein cyanohydrin and methyl mercaptan.

When prepared in this manner, 2-hydroxy 4-methylthio butyronitrile can be used directly to manufacture methionine or its analogous hydroxy by already known methods.

We claim:

1. A process for the synthesis of 2-hydroxy 4-methylthio butyronitrile from acrolein cyanohydrin and methyl mercaptan comprising:
  A. preparing a solution of acrolein cyanohydrin and a basic agent, said basic agent being used in an amount such that said solution diluted from 5 volumes to 100 volumes with distilled water has 100 pH between 7 and 8,
  B. adding to said solution methyl mercaptan in an amount between 10 and 50 percent in excess of the stoichiometric amount relative to the cyanohydrin, whereby a reaction occurs producing 2-hydroxy 4-methylthio butyronitrile and leaving an excess methyl mercaptan, said reaction being maintained between 0° and 65° C,
  C. eliminating the excess mercaptan.

2. The process of claim 1 wherein said solution has a pH between 7.2 and 7.5.

3. The process of claim 1 wherein the methyl mercaptan is added in an amount between 10 to 25 percent of the stoichiometric amount relative to the cyanohydrin.

4. The process of claim 1 wherein the pH is continuously maintained between 7 and 8 by adding a basic agent with the methyl mercaptan.

5. The process of claim 1 wherein the excess methyl mercaptan is continuously re-introduced into the solution to form a portion of the total amount.

6. The process of claim 1 wherein the excess methyl mercaptan is removed by one of degasification and carriage by an inert gas.

7. The process of claim 1 wherein the basic agent is an organic base.

8. The process of claim 1 wherein the basic agent is an alkaline carbonate.

9. The process of claim 1 wherein the basic agent is an alkaline hydroxide.

10. A process for continuously synthesizing 2-hydroxy 4-methylthio butyronitrile from acrolein cyanohydrin and methyl mercaptan comprising:
  A. introducing a solution of crude acrolein cyanohydrin and a basic agent which maintains the pH of the solution diluted from 5 volumes to 100 volumes at 7.2 — 7.5 into the top of an absorption column,
  B. concurrently introducing methyl mercaptan into the bottom of said absorption column, thereby partially transforming the solution into 2-hydroxy 4-methylthio butyronitrile,
  C. introducing the partially transformed solution into a reactor,
  D. concurrently introducing into said reactor additional methyl mercaptan, whereby the methyl mercaptan present in the reactor is about 25 percent in excess relative to the incoming cyanohydrin, thereby forming a product of 2-hydroxy 4-methylthio butyronitrile and an excess of free methyl mercaptan, said formation being maintained between 0° and 65° C,
  E. introducing said product into a degasification column,
  F. passing inert gas through the degasification column to remove said free methyl mercaptan with the inert gas,
  G. transferring said free methyl mercaptan into the bottom of said absorption column, and
  H. recycling the inert gas into the degasification column.

* * * * *

UNITED STATES PATENT OFFICE
CERTIFICATE OF CORRECTION

Patent No. 3,699,148          Dated  October 17, 1972

Inventor(s)  Claude Darcas et al.

It is certified that error appears in the above-identified patent and that said Letters Patent are hereby corrected as shown below:

Column 4 Line 18 --244-methylthio-- should read -- 2-hydroxy 4-methylthio--. Column 4 Line 64 --soda-- should read --sodium--. Column 4 Line 66 --soda-- should read --sodium--. Column 5 Line 2 --soda-- should read --sodium--. Claim 1, Column 6 Line 1 --100-- should read --a--.

Signed and sealed this 10th day of April 1973.

(SEAL)
Attest:

EDWARD M. FLETCHER, JR.                ROBERT GOTTSCHALK
Attesting Officer                       Commissioner of Patents